(12) United States Patent
Blumberg et al.

(10) Patent No.: US 6,496,776 B1
(45) Date of Patent: Dec. 17, 2002

(54) POSITION-BASED INFORMATION ACCESS DEVICE AND METHOD

(76) Inventors: Brad W. Blumberg, 9 Signal Hill Dr., Vorhees, NJ (US) 08043; Eric M. Blumberg, 5 Island Ave., Island Ter., Apt. 8J, Miami, FL (US) 33139

( * ) Notice: Subject to any disclaimer, the term of this patent is extended or adjusted under 35 U.S.C. 154(b) by 0 days.

(21) Appl. No.: 09/774,120

(22) Filed: Jan. 31, 2001

Related U.S. Application Data (63) Continuation-in-part of application No. 09/639,265, filed on Aug. 15, 2000.
(60) Provisional application No. 60/186,155, filed on Feb. 29, 2000.

(51) Int. Cl.⁷ .............................................. G01C 21/00
(52) U.S. Cl. ...................... 701/213; 701/214; 340/988; 342/357.09
(58) Field of Search .................. 701/213, 214, 701/211; 340/988; 342/357.08, 357.09, 357.1

(56) References Cited

U.S. PATENT DOCUMENTS

| | | |
|---|---|---|
| 5,032,989 A | 7/1991 | Tornetta |
| 5,594,425 A | 1/1997 | Ladner et al. |
| 5,684,859 A * | 11/1997 | Chanroo et al. .............. 379/58 |
| 5,794,216 A | 8/1998 | Brown |
| 5,852,810 A | 12/1998 | Sotiroff et al. |
| 5,901,214 A | 5/1999 | Shaffer et al. |
| 5,930,699 A | 7/1999 | Bhatia |
| 5,938,721 A | 8/1999 | Dussell et al. |
| 5,944,769 A | 8/1999 | Musk et al. |

OTHER PUBLICATIONS

"SnapTrack Awarded Patent For Locating or Tracking Wireless Devices Via Internet and Client–Server–Based Computer Networks",http://famulus.msnbc.com/famuluscom/businesswire01–23–050325.asp?sym=QCOM, Jan. 23, 2001.
"Lucent Technologies and Profilium Inc. Announce Alliance Agreement to Deploy Advanced Location–Based Mobile Advertising Solution", http://www.hoovershbn.hoovers.com/bin/story?StoryId=CoM0p0bKbytiXmdi&FQ=c . . . %20L.
"The Meaning of Telematics", http://www.globaltelematics.com/telematics.htm Oct. 20, 2000.
HomeFinder—Find the Home That's Right for You from http://www.homefinder.com, no date.
Printout from http://www.homescape.com/buying/, no date.
zipRealty.com: The zipRealty.com Buyer's Advantage fromhttp://www/ziprealty.com/buy_a_home/advantage-.jsp, no date.

(List continued on next page.)

Primary Examiner—Yonel Beaulieu
(74) Attorney, Agent, or Firm—Cooley Godward, LLP (57) ABSTRACT

A system and method retrieve location-centric information. The method includes providing geographic position information of a wireless device to an information system or database and receiving location identifiers based on the geographic position. Each location identifier has related location-centric information that can be viewed by the user of the wireless device.

28 Claims, 6 Drawing Sheets

OTHER PUBLICATIONS

Homes for Sale—MSN HomeAdvisor from http://homeadvisor.msn.com/homes/overview.asp, no date.

REALTOR.com: Real Estate—Find a new home and a realtor fromhttp://www.realtor.com/FindHome/default.asp, no date.

REALTOR.com: Real Estate—Homes for Sale in New Jersey fromhttp://www.realtor.com/newjersey/nbselnj.asp, no date.

REALTOR.com: Real Estate—Homes for Sale in Atlantic City fromhttp://www.realtor.com/atlanticcity/nbregion4.asp, no date.

REALTOR.com: Find a Home—Select Property Type from http://www.realtor.com/PropType.asp?pgnum=1&st=nj&frm=bycomm&mls=atlanticcity&mlsttl=Atlantic=City&comm, no date.

REALTOR.com: Real Estate in Bay Area from http://www.realtor.com/selectnb.asp?frm=bycomm&st=nj&mls=atlanticcity&mlsttl=Atlantic=City&comm=Bay=Area&, no date.

REALTOR.com: Real Estate—Find a Neighborhood fromhttp://www.realtor.com/FindNeig/default.asp, no date.

* cited by examiner

POSITION-BASED INFORMATION ACCESS DEVICE AND METHOD

CROSS-REFERENCE TO RELATED APPLICATIONS

This application claims priority under 35 U.S.C. 120 to U.S. application Ser. No. 09/639,265, filed Aug. 15, 2000 and entitled "Global Positioning-Based Real Estate Database Access Device and Method," incorporated herein by reference, which claims priority under 35 U.S.C. 119(e) to U.S. application Ser. No. 60/186,155, filed Feb. 29, 2000, entitled "Global Positioning-Based Real Estate Database access Device and Method," incorporated herein by reference. This application is related to concurrently filed U.S. Patent Application entitled "Position-Based Information Access Device and Method of Searching Same," U.S. application Ser. No. 09/774,119 incorporated herein by reference, which is a CIP of Appl. Ser. No. 09/639,265

BACKGROUND OF THE INVENTION

1. Field of the Invention

The present invention relates to a method and apparatus for accessing and managing property-centric information, and, more particularly to a wireless device that uses positioning data to access such information.

2. Description of the Related Art

People often desire to obtain information about a particular location at which they are located, whether it be a famous or historic landmark, an office building, a business location, a piece of real estate, an airport, a hotel, shopping mall, or a sports arena. The traditional methods of obtaining such information include using printed materials such as guide books, maps, etc., communicating with people knowledgeable about the particular location, and researching the particular location either before or after being physically present at the location.

Such methods of obtaining information may significantly detract from the person's ability to appreciate or experience the location at which they are present. Put more simply, the person may not be able to gather or access enough information about the location because it is not readily available. For example, if a person is visiting a famous landmark at a time when there are no tour guides available and the local gift shop is closed, the person may not be able to obtain valuable information about the landmark. Although the person may be able to get the information later, that isn't always a suitable alternative. Even in the event where a person is able to obtain printed materials, they are often cumbersome to carry around and read through while traveling from place to place. Moreover, as a person visits numerous locations, they tend to accumulate vast amounts of printed materials.

Another example in which location-specific information is not readily obtained is during a real estate search. The traditional method of buying real estate requires the prospective purchaser to transact through a real estate broker for virtually every aspect of the transaction, from finding a desired property to completing the sale. Often the most difficult part of the process, from the buyer's perspective, is locating a desired piece of real estate. There are generally two methods employed to locate a desired piece of property.

The first method relies solely on the real estate broker to use his or her contacts, including listing services, to locate property that meets the buyer's specifications. The second is more random, in that if a buyer happens to pass a piece of property that is displaying a "for sale" sign, the buyer can write down the phone number shown on the sign to later inquire about the property, which then places the transaction totally within the broker's hands, as the broker controls all the information relating to the property (e.g., size and cost).

People also have a difficult time finding exactly the right features in their house search or have trouble adding exactly the right features to their existing homes. People generally have difficulty finding exactly the right manufacturer or service provider to provide particular features for their home or office. Moreover, it is difficult to find an architect to design a home of the style that a person desires, or to find a landscaper or gardener to achieve a look that a person wants, etc. Most often, people will look in the phone book to get a list of service providers or manufacturers and then end up driving all over town to review samples of various service providers' work.

Over the last few years, various computer-related methods for locating real estate have been introduced. For example, U.S. Pat. No. 5,032,989 relates to a computerized map-based real estate search system in which a user can zoom in on a map to greater levels of detail, in order to obtain a more accurate view of the location of an available piece of property. The mapping system in the '989 patent is centered about a user-selectable landmark, and the different maps that are generated are also centered about the landmark. There is an associated property database that can be accessed remotely either by searching by specified criteria or by using the mapping system. Additionally, U.S. Pat. No. 5,852,810 covers an Internet map-based real estate search system that operates in a similar manner to the '989 patent. The system disclosed in the '810 patent also permits a user to search criteria after narrowing the map-based search down to the city level, thereby allowing a criteria-based search in addition to a location-based search.

When accessing property information via a computer, it is often desirable to view an image of the property at the same time. In this regard, U.S. Pat. No. 5,794,216 is directed to an interactive multimedia real estate database including interior images and exterior images of the selected house, the floor plan of the house, a textual description of the property, etc. Additionally, links are provided on the exterior image of the house that, if clicked, permit the user to view the interior of the corresponding room.

The foregoing patents require a user to be located at a computer, and remote from the property. The technology disclosed in these patents is not effective when a buyer is driving past a particular piece of property and would like additional information about that property. It would be desirable for a prospective buyer to be able to access information relating to a piece of property as the buyer was present at the property, at any time of day, and whether or not the property displayed a "for sale" sign. This type of information is ideally suited to be transmitted via a wireless device.

U.S. Pat. No. 5,930,699 relates to an address retrieval system based on the position of a cellular telephone. A cell phone user can request information relating to businesses that are located in the proximity of the user, based upon the geographic position of the user as determined by pinpointing the location of the cell phone. Once the location of the user is determined, a database that is keyed on geographic location is searched, looking for businesses of the type requested by the user (e.g., restaurants, gas stations, hotels, etc.) that are located in the area around the user.

U.S. Pat. No. 5,938,721 discloses a mobile computer system having a built-in global positioning system (GPS)

locator and an associated database that displays relevant information to the user based upon the user's current location. The database is accessed in real time as the user's position changes and is primarily focused on task-based information. For example, if a stored task is to buy milk, as the user approaches the grocery store, he or she is reminded to buy milk. This patent also discusses route planning between multiple stops, as well as a business-locating function similar to that described in the '699 patent.

It will thus be appreciated that it is difficult for a person to obtain information related to a specific location without the person knowing their actual location. It is further difficult for a person to locate information about service providers that contributed to the construction or maintenance of a particular location.

SUMMARY

In an effort to address the aforementioned problems, the embodiments of the present invention strive to provide an apparatus and methods whereby an individual is able to readily obtain location-centric information about a specific physical location via a wireless device.

Other objects, advantages and features associated with the embodiments of the present invention will become more readily apparent to those skilled in the art from the following detailed description. As will be realized, the invention is capable of other and different embodiments and its several details are capable of modification in various aspects, all without departing from the invention. Accordingly, the drawings and the description are to be regarded as illustrative in nature, and not limitative.

DETAILED DESCRIPTION

Figure 1:
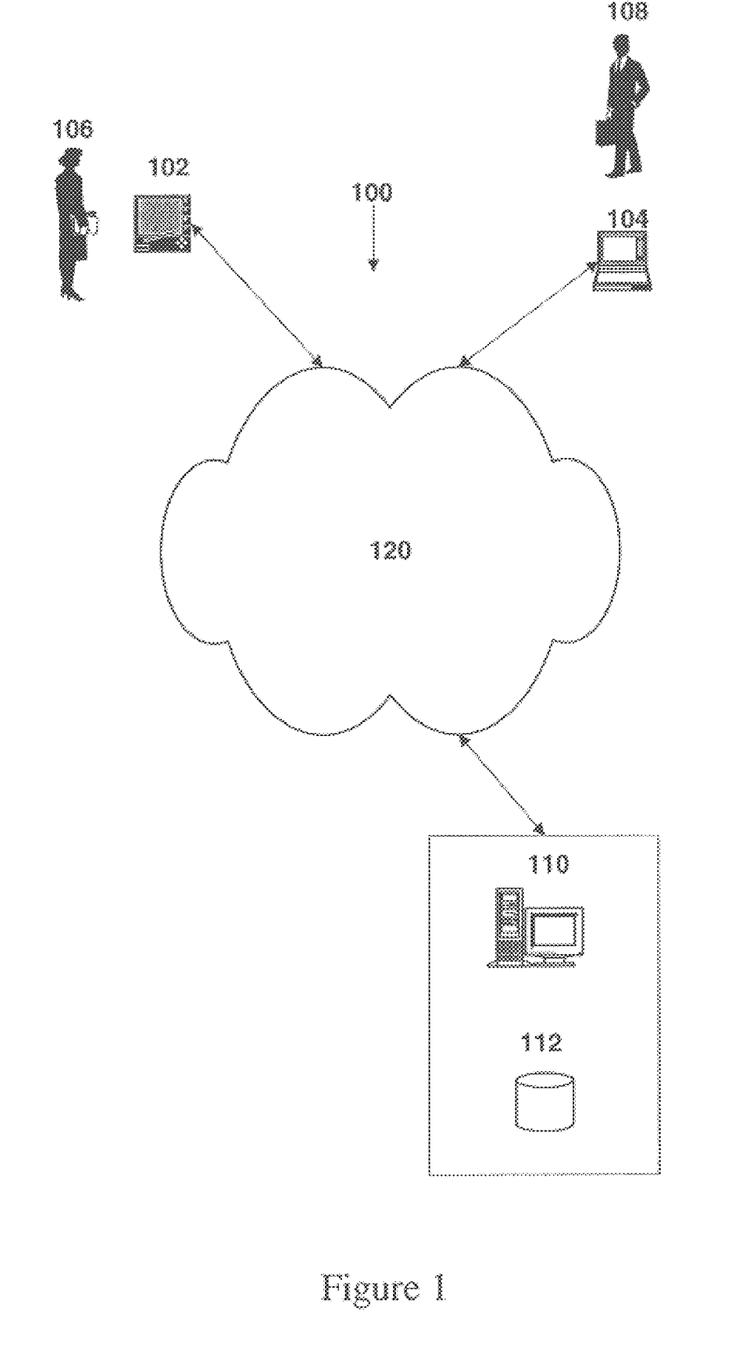
FIG. 1 is a schematic of an information retrieval system in accordance with one embodiment of the present invention.
Figure 2:
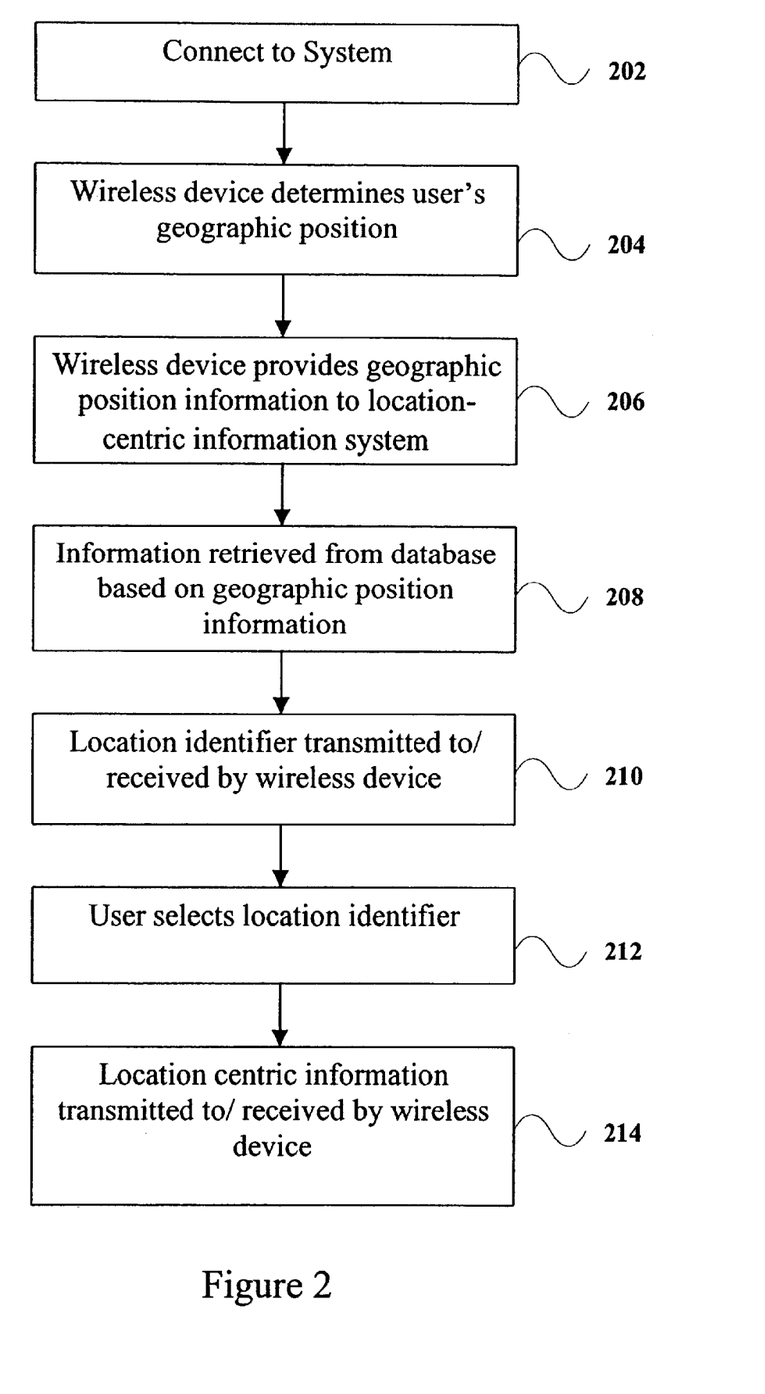
FIG. 2 is a flow diagram illustrating one embodiment of a method according to the present invention.

FIG. 1 illustrates one embodiment of an information retrieval system 100 suitable for implementing the features of the present invention, and FIG. 2 illustrates a flow chart of an exemplary method of the present invention. System 100 includes one or more wireless devices 102 and may also include a computer 104 and a location-centric information system 110 that includes an information database 112. Users 106, 108 may retrieve position-based location-centric information from location-centric information system 110 over a network 120 for use with devices 102, 104.

In one embodiment, wireless device 102 is a hand-held electronic device including a global positioning system (GPS) locator whose location can be pinpointed using known means. In another embodiment, CDMA cellular positioning technology, such as that available from QUAL-COMM may be incorporated in device 102. In a further embodiment, wireless device 102 may include a cellular telephone capable of receiving and displaying non-voice data and whose location can be pinpointed using known means. Device 102 may also be a network hybrid device. The types of location methods for use in the present invention may comprise EOA, Time Difference of Arrival (TDOA), Time of Arrival (TOA), GPS cell ID, and network-assisted GPS systems as well as others. While geographic position information may be provided to location-centric information system 110 from wireless device 102, it is also possible for location-centric information system 110 to independently determine the position of wireless device 102. Wireless device 102 may include an automobile-based device that incorporates the telematics principles.

Wireless device 102 and computer 104 are each operable by a user 106, 108 and each include a user input/output, a display, and a memory. Wireless device 102, and computer 104 are each configured to run software to retrieve and view location-centric information from database 112 of location-centric information system 110 over network 120. As described below, a user interface rendered on wireless device 102 and computer 104 also enables users 106, 108 to carry out various activities, including, for example, information retrieval, appointment scheduling, data searches, etc. Hence, wireless device 102 and computer 104 are devices by which each user 106, 108 can download and/or view information related to a landmark at which they are located and retrieve and view the information regarding the particular landmark.

For purposes of the present application, the term landmark may be used to refer to any (1) physical structure such as a residence, apartment, apartment building, detached home, partially detached home, townhouse, condominium, co-op, building, etc.; (2) natural feature such as a body of water, glacier, canyon, cave, mountain, mountain range, etc.; (3) historical feature such as a monument, memorial, statue, battle field, historic location, park, trail, etc.; or (4) commercial feature such as a stadium, arena, school, shopping mall, strip mall, store, grocery store, parking garage, airport, hotel, inn, hostel, camp ground, car dealer, car rental establishment, hospital, etc.

Suitable implementations of wireless devices 102 and computer 104 include devices such as laptop computers, wireless telephones, portable workstations, personal data assistants ("PDA's"), pagers, and various other portable electronic communication devices capable of carrying out similar activities. Where wireless device 102 is a PDA or similar device, user 106 may utilize conventional methods to provide input. Where wireless device 102 is an automobile-based device, user 106 may utilize manual methods or voice commands to provide input to wireless device 102. In such a situation, wireless device 102 is equipped with voice-recognition software known in the art.

Network 120 may be any form of interconnecting network including an intranet, such as a local or wide area network, or an extranet, such as the World Wide Web or the Internet. Network 120 can be physically implemented on a wireless or wired network, on leased or dedicated lines, including a virtual private network (VPN). Communications network 120 can be any type of communications network, such that computer 104 and wireless device 102, whether a hand-held electronic device or a cellular telephone, can both access location-centric information system 110 to retrieve and view information from database 112. The present invention may be used in conjunction with a wireless operating system such as the Wireless Application Protocol (WAP).

In one embodiment, system 100 is a WINDOWS based system. In another embodiment, system 100 is a PALM based system. In yet a further embodiment, system 100 is a UNIX based system. System 100 may also be internet-based and generate web-browser and web page data, such as HTML, JavaScript, Java applets, etc.

While the present invention may be used in conjunction with any of the categories of landmarks described above, it may be used in a real estate context. Many of the examples illustrated herein relate to use of the present invention with respect to real estate. However, the present invention is applicable to any of the landmarks described above.

Database 112 may be an ODBC-compliant database, such that it is accessible via a variety of database programs. Database 112 may include a variety of different location-centric information regarding each landmark stored therein. Database 112 may also include textual data and a voice description of a landmark at a particular location, such that this information can be retrieved by either wireless device 102 or computer 104. Database 112 may also include photographs of the property, floor plans of any buildings on the property (in two-dimensional and three-dimensional views), animation, or video footage of the property, representing a virtual walk-through of the property. The accessibility of these graphical elements of database 112 may be dependent upon the display capabilities of the receiving device. In one embodiment of the present invention, database 112 may be used in connection with a multiple listing service (MLS) to provide information on as large a number of properties as possible.

Accordingly, although location-centric information system 110 may store information related to real estate, it may store other information as well. The information may be stored in a single database 112 or multiple databases. For example, location-centric information system 110 may store any combination of information regarding any of the following in any number of databases 112. Location-centric information system 110 may include information regarding single family homes, condominiums, town houses, apartments, historic buildings, monuments, memorials, parks, statues, bodies of water, mountain ranges, canyons, trails, etc. The location-centric information system 110 may further include information regarding office buildings, including directories, occupants/tenants, floor plans, lease data/availability, specifications, services offered in the building, etc. Location-centric information system 110 may further include information regarding business locations such as retail outlets, and restaurants, including information about services offered, menus, prices, etc. Location-centric information system 110 may also include information regarding airports, including maps, flight information, parking information, retail information, etc. Location-centric information system 110 may also include information regarding hotels including room availability, rates, historical information, directories, etc. Location-centric information system 110 may include information related to shopping malls including directory information, maps, operating hours, parking information, etc. Location-centric information system 110 may also include information regarding sports arenas such as seating diagrams, concessions available, services offered, etc. Location-centric information system 110 may include any information about any location that may be provided by a representative of the particular location to be included in database 112 or that may be independently entered into database 112 by a party not affiliated with the particular location.

Any one of or combinations of the above-described information stored by database 112 may be communicated to wireless device 102, and computer 104 over network 120 in the manner described in greater detail below.

The following description of the operation of system 100 includes the function and interaction of user 106 and wireless device 102 with the remainder of system 100 illustrated in FIG. 1. However, it is to be understood that the following description is equally applicable to user 108 and computer 104, and multiple other users and wireless devices, or portable computers not illustrated in FIG. 1.

One method of the present invention will now be described in reference to FIG. 2. As will be apparent, the operations illustrated in FIG. 2 need not occur in the illustrated order. As illustrated by FIG. 2, at an operation 202, wireless device 102 may be connected to location-centric information system 110 via network 120 according to known methods. At an operation 204, user's 106 location (i.e., geographic position, latitude/longitude) is determined using one of the methods described above. At an operation 206, wireless device 102 provides the geographic position information to location-centric information system 110.

In an operation 208, location-centric information system 110 may retrieve location-centric information from database 112 based on the geographic position information provided by wireless device 102. In one embodiment, location-centric information system 110 also retrieves a location identifier from database 112. A location identifier is an indicator associated with a particular landmark. The location identifier is representative of a landmark located at the geographic position associated with wireless device 102 and may take any of a variety of forms. For example, a location identifier may be a street address of a residential unit (e.g., house, condominium, etc.) at which user 106 is located. Alternatively, the location identifier may be a video image such as a picture or other graphical representation of the landmark at which user 106 is located. Further, the location identifier may be a video or audio representation of the landmark at which user 106 is located. Location-centric information is that information related to the location identifier. The location-centric information is that information described above as being stored in database 112 and may also include information available over network 120 that is related to a location identifier such as detailed residential unit information including house description, sale price, etc.

Figure 3:
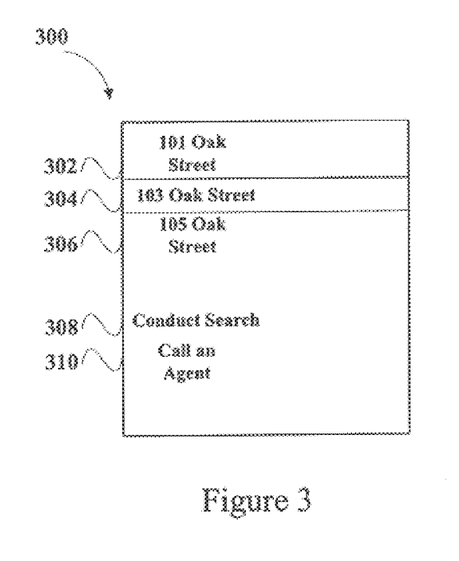
FIG. 3 is an example of a location identifier display produced on a wireless device of the system illustrated in FIG. 1.

In an operation 210, a location identifier is transmitted to, and ultimately received by, wireless device 102. Alternatively, a plurality of location identifiers may be transmitted to wireless device 102. FIGS. 3–13 illustrate exemplary displays that may be viewed by user 106 accessing system 100 of the present invention in the search for a particular piece of real estate. As illustrated in FIG. 3, wireless device 102 presents a location identifier display 300 for viewing by user 106. Location identifier display 300 may be an interactive display viewed by user 106 when user 106 desires to import location-centric information to wireless device 102 from location-centric information system 110. Hence, wireless device 102 may include computer executable software code stored on a computer readable medium of wireless device 102 for prompting user 106 to select the appropriate location identifier to retrieve the appropriate location-centric information from location-centric information system 110 to wireless device 102. User 106 can interact with the display using a keyboard, a touch screen, a microphone, etc. In one embodiment, location identifier display 300 presents interactive links 302, 304, 306, 308, 310 that user 106 may use to import or retrieve the desired location-centric information from location-centric information system 110, or perform some other function using location-centric information system 110 as will be described. Interactive links 302, 304, 306, 308, 310 may include a location identifier.

Other interactive links may be provided for various functions such as searching database 112 as will be described below. For example, as illustrated in FIG. 3, location identifier display 300 also includes a conduct search icon 308, which permits user 106 to perform a search of database 112 and a "Call Agent" icon 310 which allows user 106 to contact a person with greater knowledge of the particular location.

In the embodiment illustrated in FIG. 3, interactive links 302, 304, 306 include location identifiers in the form of street addresses. In this embodiment, a plurality of location identifiers 302, 304, 306 may be included when the location-centric information system 110 is unable to attribute the geographic position of wireless device 102 with a particular landmark. This may occur, for example, when a geographic position corresponds to several entries in database 112. In such a case, location-centric information system 110 provides the possible location identifiers corresponding to the several entries within a predetermined or random radius of the geographic position of wireless device 102. For example, if user 106 is located on a street in front of several houses, location-centric information system 110 may provide location identifiers indicating the street address of the houses in the general vicinity. More specifically, as illustrated in FIG. 3, when user 106 is located, for example, in front of "103 Oak Street" location-centric information system 110 may provide location identifiers of "101 Oak Street," "103 Oak Street," and "105 Oak Street." As mentioned above, the location identifiers may also take the form of graphic images of the houses provided wireless device 102 is capable of providing such a display.

In another example, if user 106 is located in the Grand Canyon and desires to retrieve information about the Canyon, the location identifiers that may be provided may relate to the direction user 106 is facing (e.g., North, South, West, East). When user 106 selects the appropriate location identifier, location-centric information may be provided based on the direction user 106 is facing.

Geographic position information of wireless device 102 may be attributed to a distinct landmark within location-centric information system 110. In that case, location-centric information system 110 may only transmit to wireless device 102 a single location identifier. In such an embodiment, user 106 would then select the single location identifier. In another embodiment, location-centric information system 110 may provide a plurality of location identifiers 302, 304, 306, but may highlight the location identifier that is attributed to the distinct landmark as shown at 304. In this manner, user 106 may actively choose from alternative location identifiers 302, 306. In a further embodiment, where a precise location is provided to location-centric information system 110 from wireless device 102, location-centric information system 110 may transmit to wireless device 102 only location-centric information relevant to the particular location without user 106 ever actively selecting the location identifier. In such a situation, user 106 may be passively selecting the appropriate location identifier by virtue of user's 106 position with respect to the particular location.

When presented with a location identifier 302, 304, 306, user 106, in an operation 212, user 106 selects the appropriate location identifier. Upon selecting the location identifier, location-centric information system 110 transmits location-centric information related to the selected location identifier to wireless device 102. In those embodiments where in location identifier is transmitted, location-centric information system 110 transmits location-centric information to wireless device 102 when the distinct landmark is identified.

Figure 4:
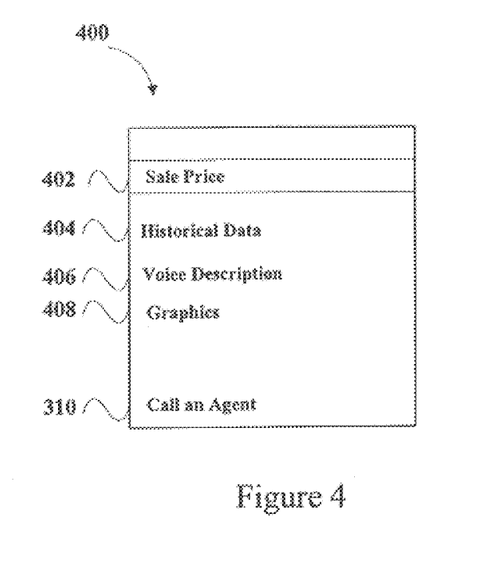
FIG. 4 is an example of an information search display produced on a wireless device of the system illustrated in FIG. 1.

When wireless device 102 receives the location-centric information in an operation 214, user 106 is able to manipulate the location-centric information to obtain location-centric information relevant to user 106. For example, FIG. 4 illustrates an example of a location-centric information search display 400 viewed by user 106 upon receiving location-centric information. Location-centric information search display 400 may include a menu or list of icons with selections 402, 404, 406, 408, 410 for user 106 to choose from to obtain more narrowly tailored or focused information about the particular place at which they are located. In the illustrated embodiment of a user accessing system 110 for a real estate transaction, such information may include sale price 402, historical data 404, voice description 406, and graphics 408. The list can be expanded beyond these four options as would be apparent. Selecting sale price item 402 may present to user 106 the current sale price for the property, as will be discussed below. Choosing historical data item 404 may present user 106 with the historical sale prices for the property in order to assess the property's appreciation over time. Selecting voice description option 406 may play back a spoken description of the property. Finally, selecting graphics item 408 may display any available graphics (e.g., floor plans, exterior or interior views, or walk-throughs) relating to the property.

Figure 5:
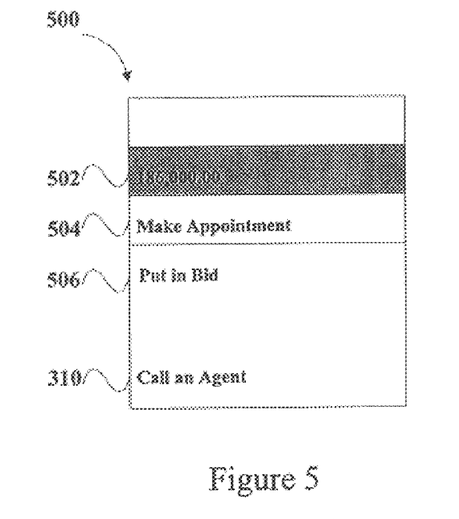
FIG. 5 is an example of a data retrieval display produced on a wireless device of the system illustrated in FIG. 1.
Figure 6:
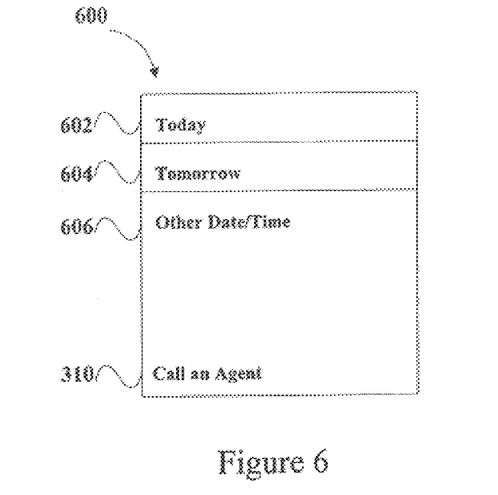
FIG. 6 is an example of an appointment display produced on a wireless device of the system illustrated in FIG. 1.

If user 106 selects one of items 402, 404, 406, 408, 410 from search display 400, a data retrieval display 500 may be displayed, an example of which is illustrated in FIG. 5. Data retrieval display 500 can include more detailed information 502 and action icons 504, 506, 510 which enable user 106 to take action based on detailed information 502 regarding the particular location at which user 106 is located. Referring to the illustrated embodiment, when user 106 selects sale price icon 402, sale price 502, an option to make an appointment 504 to view the property, and the ability to place a bid 506 on the property may be displayed.

Where user 106 chooses an action icon 504, 506, 510, user 106 may be presented with a display 600 that may allow user 106 to take some action with respect to the property at which user 106 is located. In the illustrated embodiment, assuming user selects make appointment item 504, an appointment display 600 is viewed by user 106 as illustrated in FIG. 6. From appointment display 600, user 106 can choose from pre-selected appointment times such as today 602, tomorrow 604, or schedule a different appointment time 606. If user 106 selects bid item 506, user 106 will be prompted to enter a bid amount, which will be transmitted back to database 112. In this manner, user 106 is able to interact with database 112.

Figure 7:
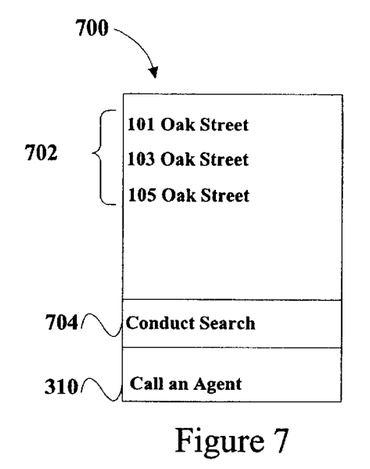
FIG. 7 is an example of a search initiation display produced on a wireless device of the system illustrated in FIG. 1.
Figure 8:
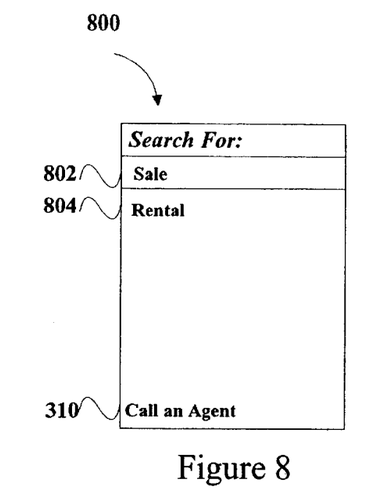
FIG. 8 is an example of a search selection display produced on a wireless device of the system illustrated in FIG. 1.

FIGS. 7–12 illustrate various exemplary displays on wireless device 102 that may be viewed by user 106 when user 106 desires to search for a particular landmark (i.e., building, property, park, body of water, etc.). FIG. 7 illustrates a search initiation display 700 shown after user's 106 location has been determined using one of the methods described above. Search initiation display 700 may be similar to location identifier display 300 illustrated in FIG. 3 provided location identifier display 300 includes a conduct search icon 308 as illustrated. Search initiation display 700 allows user 106 to search database 112 for more detailed information as will be described. In the illustrated embodiment of user 106 conducting a real estate transaction, search initiation display 700 includes a list 702 of street addresses of properties adjacent to the particular property in which user 106 is concerned, and a conduct search icon 704. If user 106 desires assistance at any time during the search process, user 106 may select call agent item 310, and user 106 will be connected to an operator or recording that may provide additional instruction or information. Such a feature may be available whether user 106 is using wireless device 102 to conduct a real estate transaction or any other type of transaction. Call agent item 310 is accessible from any of the displays described.

Figure 9:
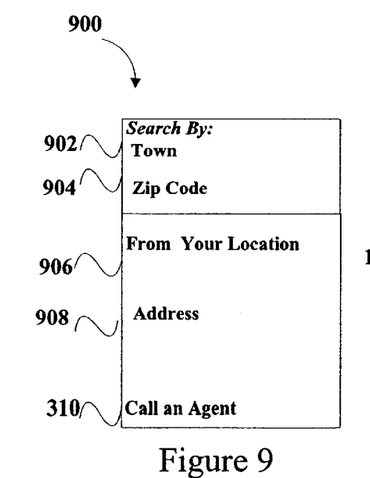
FIG. 9 is an example of a criteria selection display produced on a wireless device of the system illustrated in FIG. 1.

User 106 enters the search process after selecting conduct search item 704 from search initiation display 700. A search selection display 800, illustrated in FIG. 8, can then viewed by user 106. Search selection display 800 allows user 106 to choose from broad categories of selection criteria. For example, in the illustrated embodiment, where user 106 is interested in real estate, they may be given the option of searching for properties to either rent or buy. User 106 may be presented with selection icons 802, 804 to prompt the database to narrow the search to a particular category. As illustrated in FIG. 9, user 106 may be presented with a criteria selection display 900 that allows user 106 to further define the search criteria within the chosen category based on the chosen selection icon 802, 804 from search selection display 800. Criteria selection display 900 includes search criteria or search options 902, 904, 906, 908. In the illustrated embodiment, criteria selection display 900 includes a menu of search options, including search by town 902, search by zip code 904, search by present location 906, and search by street address 908.

Figure 10:
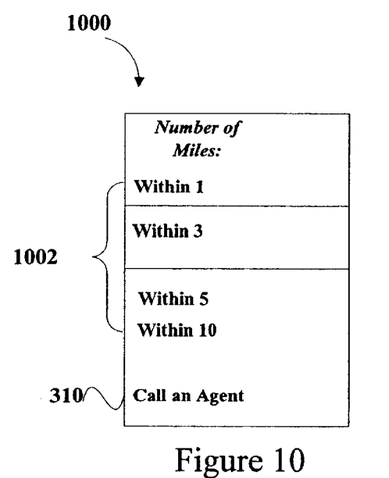
FIG. 10 is an example of a transaction type display produced on a wireless device of the system illustrated in FIG. 1.

Upon making a selection from criteria selection display 900, user 106 may then be presented with a transaction type display 1000 that allows user 106 to define the specific criteria chosen from criteria selection display 900 by using a selection list 1002. In the illustrated embodiment, assuming that user 106 chooses search by present location item 906, a transaction type display 1000 is viewed, from which user 106 can narrow the geographic scope of the search by selecting, for example, a predefined radius 1002.

Figure 11:
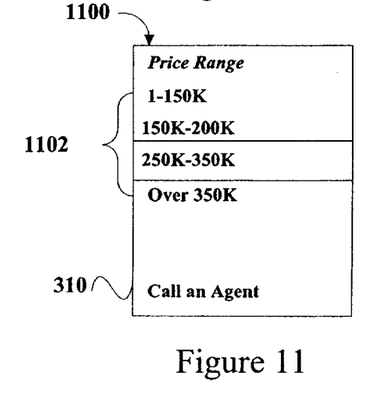
FIG. 11 is an example of a narrow search display produced on a wireless device of the system illustrated in FIG. 1.

Once user 106 defines the specific search criteria, user 106 may be presented with a narrow search display 1100, to further narrow the search results within the specific criteria by choosing from a selection list 1102 of narrowing criteria. In the illustrated embodiment, user 106 selects, for example, the price range for the property from a list of price ranges 1102. The list of narrowing criteria may include any criteria that would narrow the search results retrieved. For example, the criteria could include features such as number of bedrooms, number of bathrooms, square footage, location (i.e., near a golf course, near a lake, etc.).

Figure 12:
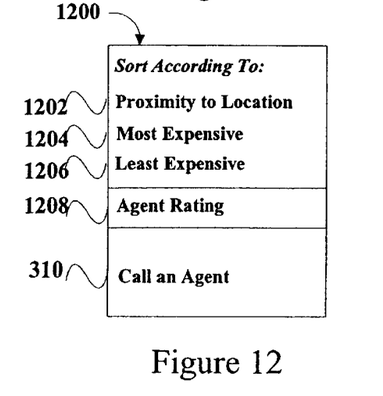
FIG. 12 is an example of a data presentation display produced on a wireless device of the system illustrated in FIG. 1.

FIG. 12 illustrates a data presentation display 1200 that permits user 106 to select the order in which the search results are to be presented. User 106 may be given options 1202, 1204, 1206, 1208 to choose from. In the illustrated embodiment, the results can be sorted by proximity to user's 106 present location 1202, in descending order starting with the most expensive property 1204, in ascending order beginning with the least expensive property 1206, and by property rating 1208. The property rating 1208 is a proprietary rating determined on the basis of the condition of the property, the location of the property, and the list price of the property.

There may be an infinite number of displays and search criteria screens that allow user 106 to narrow or expand their search for a particular landmark. The present invention is not limited to the number of search screens illustrated and disclosed above. For example, in another embodiment of the invention, there may be a single search screen without the ability to define search criteria. In another embodiment, user 106 may be able to decide to what extent they desire to narrow the search and execute the search prior to viewing all of the criteria narrowing search screens described above.

The embodiments described above allow user 106 to retrieve information about a particular landmark near which they are located. If a person is looking for a house, apartment, or other property to rent or purchase, the property near which they are located may not be for sale or rent. But the person may like some of the features of the home or the general design. In that case, the person would benefit from knowing similar properties in the area that are for sale or rent.

Figure 13:
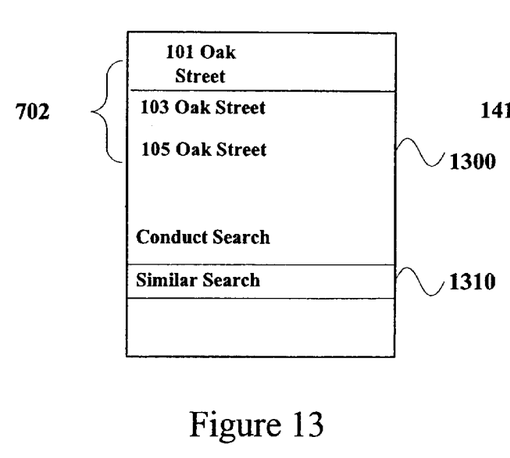
FIG. 13 is an example of a similar search display produced on a wireless device of the system illustrated in FIG. 1.
Figure 14:
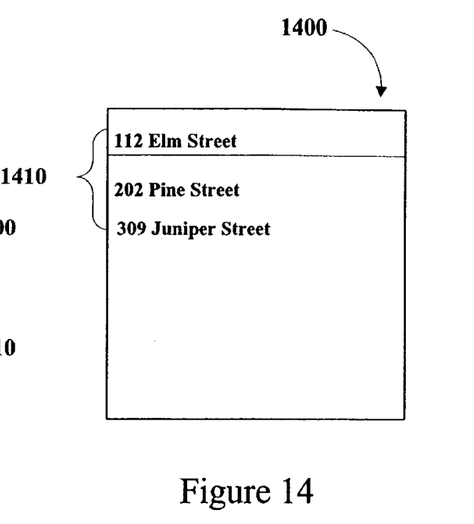
FIG. 14 is an example of a similar search results display produced on a wireless device of the system illustrated in FIG. 1.
Figure 15:
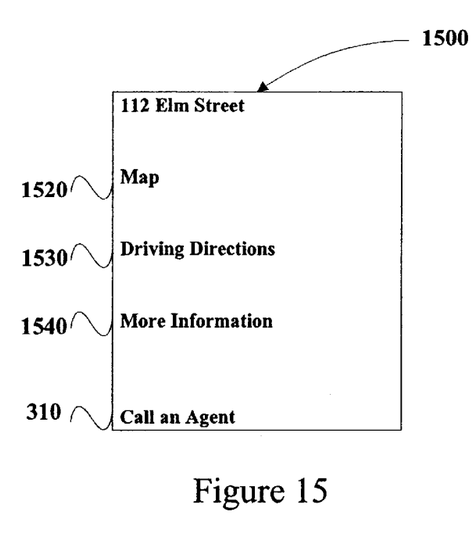
FIG. 15 is an example of a similar search address display produced on a wireless device of the system illustrated in FIG. 1.
Figure 16:
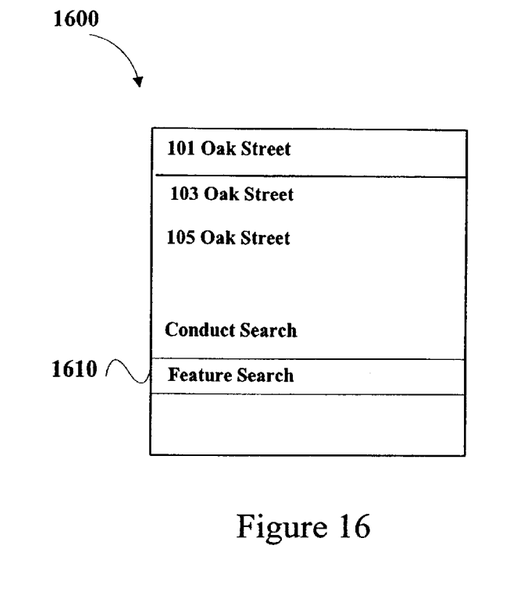
FIG. 16 is an example of a feature search display produced on a wireless device of the system illustrated in FIG. 1.

In the embodiment illustrated in FIGS. 13–15, it is possible for user 106 to search for a landmark that has similar features or attributes as a landmark in front of which user 106 is located. In such a situation, user 106 may view similar search display 1300 that includes a similar search icon 1310. For example, if user 106 is located in front of a home that is not for sale, but user 106 would like to purchase a similar home, by choosing the appropriate location identifier 702, and similar search icon 1310, location-centric information system 110 may provide multiple location identifiers or addresses 1410 of second homes that are for sale having similar attributes to the first home. The results may be displayed in a similar search results screen 1400. When user 106 is presented with similar search results screen 1400 with multiple location identifiers 1410, user 106 may then choose a single location identifier or address about which to obtain more detailed information. User 106 may then be presented with a similar search address display 1500. From similar search address display 1500, user 106 may choose to receive a map 1520 to the second home, driving directions 1530 to the second home, and more information 1540 about the second landmark (e.g., sale price, school district, days on market, etc.). The search criteria may be more narrowly defined as described above with reference to FIGS. 7–12 such that only similar homes for sale within a certain radius, price range, etc. are shown.

User 106 may choose which attributes of the home in which they are interested to tailor the search to only include homes for sale that include that particular attribute. For example, if user 106 likes the style of the home (e.g., colonial, split-level) then user 106 may narrow the search criteria to only search for similar homes of a particular style.

The attributes contained in location-centric information system 110 include, but are not limited to, home style, parcel lot size, number of floors, number of bedrooms, number of bathrooms, roof style, window style, architect, builder, landscaping, garage features, kitchen features, flooring features, utility features, color, size, etc.

Figure 17:
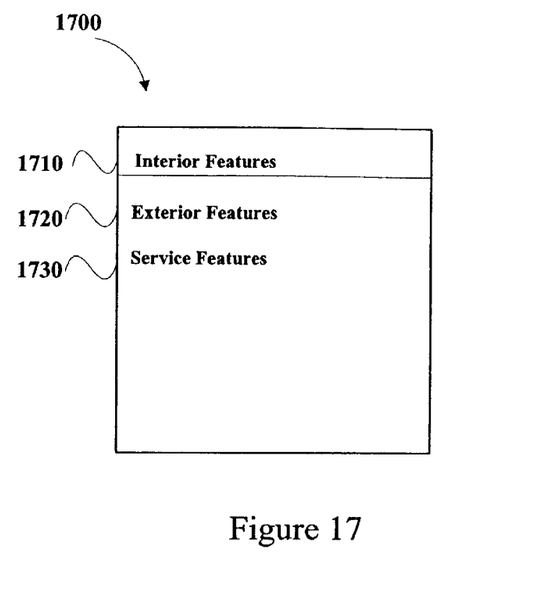
FIG. 17 is an example of a feature selection display produced on a wireless device of the system illustrated in FIG. 1.

User 106 may also obtain detailed information about a particular attribute of a landmark in which they are interested. Referring to FIGS. 16–19, user 106 may be located in front of a landmark that has a particular feature (e.g., landscaping, windows, door, design) in which user 106 is interested. In such a situation, user 106 may view a feature search display 1600 that includes a feature search icon 1610. Upon choosing feature search icon 1610, user 106 views a feature selection display 1700 as illustrated in FIG. 17. Feature selection display 1700 allows user 106 to select the type of feature of interest such as interior feature 1710, exterior feature 1720, or service feature 1730. Interior features may include such features as lighting fixtures, plumbing fixtures, flooring, wallpaper, window treatments, molding, appliances, etc. Exterior features may include such features as roof type, windows, siding, shingles, etc. Service features may include such features as landscaping, gardening, sprinkler systems, pool care etc.

Figure 18:
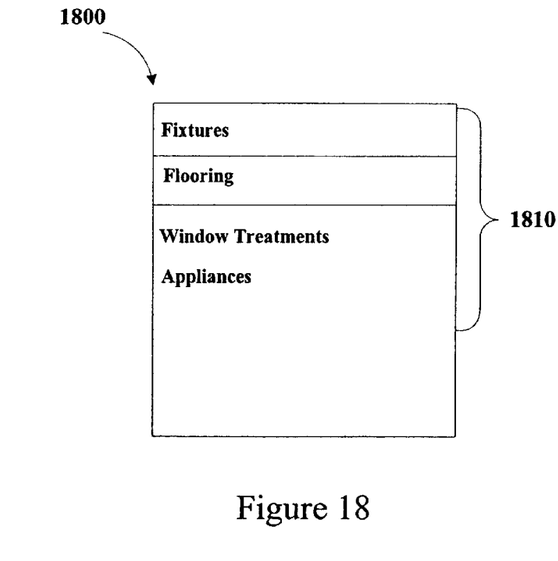
FIG. 18 is an example of a narrow feature selection display produced on a wireless device of the system illustrated in FIG. 1.
Figure 19:
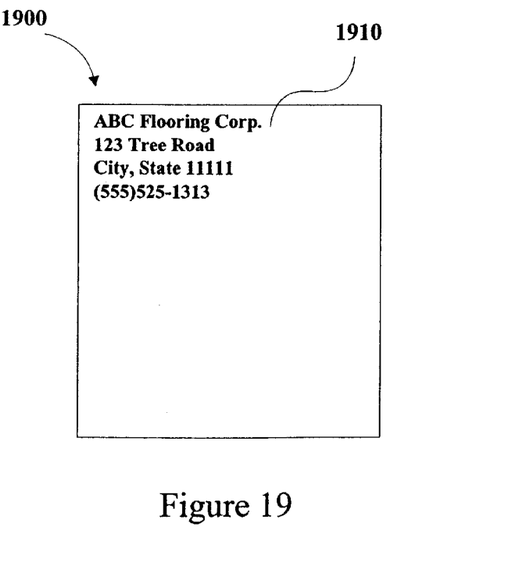
FIG. 19 is an example of a feature detail display produced on a wireless device of the system illustrated in FIG. 1.

When user 106 selects a feature 1710, 1720, 1730, user 106 can view the narrow feature selection display 1800 as illustrated in FIG. 18. From narrow feature selection display 1800, user 106 selects the particular feature of interest from a list of features 1810. The illustrated example includes interior features, but may also include exterior features and service features as apparent. Upon selecting a particular feature, user 106 may be presented with a feature detail display 1900 that includes detailed feature information 1910. The detailed feature information includes specific information about the chosen feature of the particular landmark. The specific information may include contact information for service providers that either manufacture, sell, repair, etc. the particular feature. The detailed feature information may also include contact information for the architect that designed the landmark, service providers related to the landmark, etc. User 106 may desire to view another landmark including similar features as the landmark of interest. In such a situation, user 106 may be presented with similar search results screen 1400 and similar search address display 1500 as described above. In another embodiment, only features for which the location-centric information system has information are provided in the feature list 1810.

For example, if user 106 approached a house that had a certain color and style of brick that was desirable, user 106 would select feature search icon 1610. They would then choose exterior feature 1720 to obtain list 1810 that includes various exterior features. Upon selecting bricks or siding from list 1810, user 106 may be presented with detailed feature information. For example, the detailed feature information may include the manufacturer name, the specific manufacturer specifications for the particular bricks on the home of interest, contact information for the manufacturer, retailers that provide the particular product or similar products, contact information for those retailers, prices of the product, the particular mason or mason-sub-contractor that installed the brick, and other information associated with the brick could be provided or would be apparent etc. Contact information may be provided for particular categories of retailers or manufacturers. For example, in the present embodiment, where user 106 selected bricks from list of features 1810, detailed information regarding retailers and manufacturers of "building products" would be provided in detailed feature information 1910. Such detailed feature information 1910 could be provided for categories of service providers as well.

In another embodiment retailers and manufacturers advertise on location-centric information system 110. When user 106 selects a particular feature from list of features 1810, they may be presented with manufacturers, retailers, or service providers that provide the particular product or similar products or related services, but only if that manufacturer, retailer or service provider advertises on location-centric information system 110. The advertisement may be a paid advertisement or may be provided as a free service for simply registering with the provider of location-centric information system 110.

The principles, preferred embodiments, and modes of operation of the present invention have been described in the foregoing description. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

We claim:

1. A method of retrieving location-centric information, comprising:

providing information related to a geographic position of a wireless device to an information system;

receiving from said information system at least one location identifier based on said geographic position information, said location identifier being representative of a landmark proximate to said geographic position; and receiving location-centric information from said information system, said location-centric information related to said landmark proximate to the geographic position.

2. The method of claim 1, said receiving at least one location identifier includes receiving a plurality of location identifiers, said method further comprising:

receiving from a user a selection of one of said plurality of location identifiers; and receiving location-centric information related to said selected location identifier.

3. The method of claim 1, wherein said receiving at least one location identifier includes receiving one of a street address, a name of a historic landmark, a building name, or a business name.

4. The method of claim 1, wherein said receiving location-centric information includes receiving residential unit information corresponding to a residential unit proximate to said geographic position.

5. The method of claim 1, wherein said receiving at least one location identifier includes receiving a street address of a residential unit and said receiving location-centric information includes receiving residential unit information.

6. The method of claim 5, wherein said receiving residential unit information includes receiving information describing at least one of sale price, realtor, floor plan, physical description, or owner contact information.

7. The method of claim 1, wherein said receiving at least one location identifier includes receiving a plurality of location identifiers including one of a plurality of street addresses, a plurality of historic landmark names, a plurality of building names, or a plurality of business names.

8. The method of claim 1, wherein said providing geographic position information includes:
providing geographic position information from a global positioning system.

9. The method of claim 1, wherein said providing geographic position information includes:
providing geographic position information over at least a portion of a wireless network.

10. The method of claim 1, wherein said providing geographic position information includes:
providing geographic position information, said geographic position information being determined by the wireless device.

11. The method of claim 1, wherein said providing geographic position information includes:
providing geographic position information, said geographic position information first being received by the wireless device.

12. A method of providing location-centric information from an information system, the method comprising:
receiving geographic position information associated with a wireless device, the geographic position information including a geographic position of the device;
transmitting to the wireless device at least one location identifier based on said received geographic position information, said location identifier corresponding to a landmark proximate to said geographic position; and
transmitting to the wireless device location-centric information related to said landmark proximate to said geographic position.

13. The method of claim 12, wherein said transmitting to the wireless device location-centric information includes transmitting residential unit information corresponding to a residential unit proximate to the geographic position.

14. The method of claim 12, wherein said transmitting at least one location identifier includes transmitting a street address of a residential unit and said transmitting location-centric information includes transmitting residential unit information.

15. The method of claim 12, wherein said transmitting at least one location identifier includes transmitting one of a street address, a historic location name, a building name, and a business name.

16. The method of claim 15, said transmitting at least one location identifier including transmitting a plurality of location identifiers, wherein said transmitting a plurality of location identifiers includes transmitting one of a plurality of street addresses, a plurality of historic location names, a plurality of building names, and a plurality of business names.

17. The method of claim 12, wherein said receiving geographic position information includes receiving geographic position information over at least a portion of a wireless network.

18. A wireless device, comprising:
a transmitter operable with a position determining system capable of providing geographic position information including a geographic position of the wireless device to an information system, the information system having location-centric information;
a receiver configured to receive from said information system location-centric information based on said geographic position; and
an output device configured to output a location identifier received from said location-centric information system and said received location-centric information.

19. The wireless device of claim 18, wherein said output device is a display configured to display said location identifier and said received location-centric information.

20. The wireless device of claim 18, wherein said output device is an audio device configured to output said location identifier and said received location-centric information.

21. The wireless device of claim 19, said location identifier including a plurality of location identifiers, further comprising:
an input device configured to allow a user to select one of said plurality of location identifiers.

22. The wireless device of claim 21, said input device including one of a keyboard, a touch screen, and a microphone.

23. Computer executable software code stored on a computer readable medium operable with a wireless device, the code for:
providing information related to a geographic position associated with a wireless device to an information system;
receiving a plurality of location identifiers from said information system; and
receiving location-centric information from said information system, said location-centric information related to a landmark proximate to the geographic position.

24. The computer executable software code of claim 23, the code further comprising code for:
prompting a user to select one location identifier from the plurality of location identifiers;
receiving location-centric information related to said selected location identifier; and
displaying said received location-centric information.

25. A system, comprising:
an information database having location-centric information and at least one location identifier; and
a wireless device operable to provide geographic position information related to said wireless device to said information database, to receive from said information database said at least one location identifier corresponding to a landmark proximate to said geographic position, and to receive location-centric information related to said landmark.

26. A method of retrieving real estate information for a particular unit of real estate, comprising:

receiving from an information system at least one street address based on a geographic position of a wireless device located proximate to said geographic position, said street address being representative of said particular unit of real estate proximate to geographic position; and receiving from said information system real estate information related to said particular unit of real estate.

27. A method of locating a landmark, comprising:

providing geographic position information of a wireless device to an information system, the information system including at least a first location identifier, said first location identifier being representative of a first landmark proximate to said geographic position and having associated first location-centric information including at least one attribute descriptive of said first landmark;

receiving from said information system, a second location identifier representative of a second landmark, said second location identifier having associated second location-centric information including said at least one attribute.

28. A method of locating a landmark, comprising:

providing geographic position information of a wireless device to an information system, the information system including at least a first location identifier, said first location identifier being representative of a first landmark proximate to said geographic position and having associated first location-centric information including a plurality of attributes descriptive of said first landmark;

receiving from said information system, a second location identifier representative of a second landmark, said second location identifier having associated second location-centric information including at least one of said plurality of attributes.

* * * * *

US006496776C1

(12) INTER PARTES REEXAMINATION CERTIFICATE (1145th)
United States Patent
Blumberg et al.

(10) Number: US 6,496,776 C1
(45) Certificate Issued: Jul. 17, 2015

(54) POSITION-BASED INFORMATION ACCESS DEVICE AND METHOD (75) Inventors: Brad W. Blumberg, Voorhees, NJ (US); Eric M. Blumberg, Miami, FL (US)

(73) Assignee: SOVEREIGN BANK, Philadelphia, PA (US)

Reexamination Request:
No. 95/001,437, Sep. 1, 2010

Reexamination Certificate for:
Patent No.: 6,496,776
Issued: Dec. 17, 2002
Appl. No.: 09/774,120
Filed: Jan. 31, 2001

Related U.S. Application Data

(63) and a continuation-in-part of application No. 09/639,265, filed on Aug. 15, 2000, now Pat. No. 6,385,541.

(60) Provisional application No. 60/186,155, filed on Feb. 29, 2000.

(51) Int. Cl.
*G01C 21/20* (2006.01)
*H04Q 7/22* (2006.01)
*H04L 29/08* (2006.01)
*H04L 29/06* (2006.01)

(52) U.S. Cl.
CPC ............... *G01C 21/20* (2013.01); *H04L 29/06* (2013.01)

(58) Field of Classification Search
None
See application file for complete search history.

(56) References Cited

To view the complete listing of prior art documents cited during the proceeding for Reexamination Control Number 95/001,437, please refer to the USPTO's public Patent Application Information Retrieval (PAIR) system under the Display References tab.

*Primary Examiner* — Scott L Weaver (57) ABSTRACT

A system and method retrieve location-centric information. The method includes providing geographic position information of a wireless device to an information system or database and receiving location identifiers based on the geographic position. Each location identifier has related location-centric information that can be viewed by the user of the wireless device.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-28 are cancelled.

* * * * *